(12) United States Patent
Porsch et al.

(10) Patent No.: US 8,577,036 B2
(45) Date of Patent: Nov. 5, 2013

(54) METHOD AND DEVICE FOR TRANSMITTING MESSAGES IN REAL TIME

(75) Inventors: Roland Porsch, Speichersdorf (DE); Stefan Rothbauer, Allershausen (DE)

(73) Assignee: Siemens Aktiengesellschaft, Munich (DE)

( * ) Notice: Subject to any disclaimer, the term of this patent is extended or adjusted under 35 U.S.C. 154(b) by 319 days.

(21) Appl. No.: 12/937,398

(22) PCT Filed: Feb. 20, 2009

(86) PCT No.: PCT/EP2009/052017
§ 371 (c)(1),
(2), (4) Date: Nov. 4, 2010

(87) PCT Pub. No.: WO2009/124803
PCT Pub. Date: Oct. 15, 2009

(65) Prior Publication Data
US 2011/0055564 A1 Mar. 3, 2011

(30) Foreign Application Priority Data
Apr. 9, 2008 (DE) .................. 10 2008 018 001

(51) Int. Cl.
*H04K 1/00* (2006.01)
(52) U.S. Cl.
USPC ........... 380/255; 713/151; 713/164; 713/168; 713/189; 380/30; 380/282
(58) Field of Classification Search
USPC ............ 380/30, 282, 255; 713/151, 164, 168, 713/189
See application file for complete search history.

(56) References Cited

U.S. PATENT DOCUMENTS

| 5,600,725 A | 2/1997 | Rueppel et al. |
| 5,951,619 A * | 9/1999 | Merl et al. ..................... 701/115 |

(Continued)

FOREIGN PATENT DOCUMENTS

| CN | 1949250 A | 4/2007 |
| DE | 10141737 C1 | 4/2003 |

(Continued)

OTHER PUBLICATIONS

Menzes, et al: "Handbook of Applied Cryptography", 1997, CRC Press LLC, USA, XP-002529147, pp. 33, 322-323, 330-331, 358-360.

(Continued)

*Primary Examiner* — Beemnet Dada
*Assistant Examiner* — Kidest Mendaye
(74) *Attorney, Agent, or Firm* — Laurence A. Greenberg; Werner H. Stemer; Ralph E. Locher

(57) ABSTRACT

A method and system for transmitting a message in real time between users in a closed network of a vehicle (1), in particular a rail-mounted vehicle, are provided, wherein safety-relevant real-time data (D) of a message (N), including a transmitter ID of a transmitter (3) within the closed network, is encrypted (S1) using a private key ($K_{privA}$) of the transmitter (3) in order to generate an encrypted message (N'); the encrypted message (N'), together with the unencrypted transmitter ID of the transmitter (3), is transmitted (S2) from the transmitter (3) to a receiver (4) within the closed network via a vehicle bus (2), and the encrypted message (N') is decrypted by the receiver (4) using a public key ($K_{publicA}$) of the transmitter (3) identified by the received, unencrypted transmitter ID in order to retrieve the unencrypted message (N). The received transmitter ID is compared with the transmitter ID contained in the retrieved message (N) in order to determine whether the message (N) has been transmitted correctly.

32 Claims, 2 Drawing Sheets

(56) References Cited

U.S. PATENT DOCUMENTS

| | | |
|---|---|---|
| 6,275,165 B1 * | 8/2001 | Bezos .................... 340/3.44 |
| 6,487,646 B1 * | 11/2002 | Adams et al. ............... 711/163 |
| 6,959,086 B2 * | 10/2005 | Ober et al. ................. 380/30 |
| 8,098,823 B2 | 1/2012 | Kempf et al. |
| 2003/0188180 A1 | 10/2003 | Overney |
| 2004/0228478 A1 * | 11/2004 | Joye ........................ 380/28 |
| 2004/0260778 A1 | 12/2004 | Banister et al. |
| 2005/0033701 A1 * | 2/2005 | Challener et al. ........... 705/63 |
| 2005/0289347 A1 | 12/2005 | Ovadia |
| 2006/0093144 A1 * | 5/2006 | Reinelt ..................... 380/258 |
| 2006/0174129 A1 | 8/2006 | Brignone et al. |
| 2007/0092075 A1 | 4/2007 | Laih et al. |
| 2007/0113071 A1 | 5/2007 | Lindinger et al. |
| 2007/0274525 A1 * | 11/2007 | Takata et al. .............. 380/270 |
| 2007/0277042 A1 | 11/2007 | Dietl |

FOREIGN PATENT DOCUMENTS

| | | |
|---|---|---|
| EP | 0639907 A1 | 2/1995 |
| GB | 2293737 A | 4/1996 |
| RU | 2005132990 A | 5/2007 |
| WO | 2004032416 A1 | 4/2004 |
| WO | 2007027241 A1 | 3/2007 |

OTHER PUBLICATIONS

Klingst, H: "Auf dem Weg zum Netz des Vertrauens—Grundlagen und Besonderheiten der Public Key-Verfahren". In: Networking, Datacom 5/00, pp. 44-46—Statement of Relevance.

Menezes, et al: "Handbook of Applied Cryptography", CRC Press LLC, 1997, pp. 1-48, http://cacr.math.uwaterloo.ca/hac/about/chap1.pdf.

Menezes, et al: "Handbook of Applied Cryptography", CRC Press LLC, 1997, pp. 425-488, http://cacr.math.uwaterloo.ca/hac/about/chap1.pdf.

* cited by examiner

METHOD AND DEVICE FOR TRANSMITTING MESSAGES IN REAL TIME

BACKGROUND OF THE INVENTION

Field of the Invention

The invention relates to a method and a device for enabling transmission between users in a closed network of a vehicle.

In data transmission in closed networks, in particular in the case of safety-relevant applications, it is imperative to avoid or exclude delays to data, transpositions of data, omissions of data, and data corruption. Furthermore, correct transmission of data to the right receiver must be ensured. Vehicles, in particular also rail-mounted vehicles, have a multiplicity of components or constituent parts, such as a brake controller, a drive controller, a sanitary facilities controller or an air conditioning system controller, which are connected via a vehicle bus to a server or a central controller. Each of these components or constituent parts sends and receives data. The components are interconnected via an Ethernet bus, for example. Particularly in safety-critical applications in real time, in the case of activation of the brakes of a train for example, the data that is transmitted via the vehicle bus must not be corrupted. Corruption of the data could lead to a train crash.

Conventional systems for transmitting messages in real time between users in a closed network of a vehicle offer merely applicatory security mechanisms such as e.g. CRC (Cyclic Redundancy Check) or other checksums for the transmitted telegrams or messages. In order to check whether a message has arrived uncorrupted, the receiver checks the received message by means of a checksum. However, this is problematic if a plurality of, and possibly also less trustworthy, communication partners are disposed in the communication path or have access to the network. In conventional systems it is not possible to prove in the event of data corruption whether said corruption was caused by an internal error or by a systematic error, the received message having been sent and possibly corrupted by other communication partners. Conventional systems do not offer adequate protection, in particular against deliberate hacker attacks.

BRIEF SUMMARY OF THE INVENTION

The object of the invention is to provide a method and a device for transmitting a message in real time between users in a closed network of a vehicle, wherein corruption of the messages is prevented.

This object is achieved according to the invention by a method as claimed.

The invention provides a method for transmitting a message between users in a closed network of a vehicle, the method comprising the following steps of:

(a) encrypting safety-relevant real-time data of a message, including a transmitter ID of a transmitter within the closed network, using a private key of the transmitter in order to generate an encrypted message;

(b) transmitting the encrypted message, together with the unencrypted transmitter ID of the transmitter, from the transmitter to a receiver within the closed network via a vehicle bus;

(c) decrypting the encrypted message by the receiver using a public key of the transmitter identified by the received, unencrypted transmitter ID in order to retrieve the unencrypted message;

(d) and comparing the received transmitter ID with the transmitter ID contained in the retrieved message in order to determine whether the message has been transmitted correctly.

In an embodiment of the method according to the invention, the transmitter calculates a transmit checksum on the safety-relevant real-time data to be transmitted, including the transmitter ID of the transmitter.

In an embodiment of the method according to the invention, the transmitter encrypts the calculated transmit checksum using a private key of the transmitter in order to generate an encrypted checksum.

In an embodiment of the method according to the invention, the transmitter transmits the encrypted transmit checksum, together with the safety-relevant real-time data including the transmitter ID, to the receiver via the vehicle bus.

In an embodiment of the method according to the invention, the receiver decrypts the encrypted transmit checksum received via the vehicle bus using a public key of the transmitter identified by the received, unencrypted transmitter ID in order to determine a first receive checksum.

In an embodiment of the method according to the invention, the receiver calculates a second receive checksum on the received safety-relevant real-time data including the transmitter ID of the transmitter.

In an embodiment of the method according to the invention, the receiver recognizes a correct transmission of the safety-relevant data and of the transmitter ID if the first receive checksum is identical to the second receive checksum.

In an embodiment of the method according to the invention, the transmitter transmits the encrypted transmit checksum, together with the safety-relevant real-time data including the transmitter ID and together with the unencrypted transmit checksum, to the receiver via the vehicle bus.

In an embodiment of the method according to the invention, the receiver decrypts the encrypted transmit checksum received via the transmission channel using a public key of the transmitter identified by the received, unencrypted transmitter ID in order to determine a first receive checksum.

In an embodiment of the method according to the invention, the receiver receives the transmitted, unencrypted transmit checksum as a second receive checksum and compares this with the determined first receive checksum.

In an embodiment of the method according to the invention, the receiver recognizes a correct transmission of the safety-relevant data and of the transmitter ID if the first receive checksum matches the second receive checksum.

In an embodiment of the method according to the invention, the checksums are formed using a CRC (Cyclic Redundancy Check) method.

In a possible embodiment of the method according to the invention, the vehicle is formed by a rail-mounted vehicle.

In an embodiment of the method according to the invention, the transmitter is formed by a control unit within the vehicle.

In a further embodiment of the method according to the invention, the receiver is formed by a central control unit within the vehicle.

In a further embodiment of the method according to the invention, a plurality of control units are connected to the central control unit via a common vehicle bus.

In an embodiment of the method according to the invention, the control unit is formed by a brake controller, a drive controller, a sanitary facilities controller or an air conditioning system controller.

In an embodiment of the method according to the invention, the real-time data output by the control units has different priority levels.

In an embodiment of the method according to the invention, a key length of a key for encrypting the real-time data is set as a function of the respective priority level of the real-time data.

In an embodiment of the method according to the invention, the real-time data having a high priority level and having a short permitted response time is encrypted using a key of short key length in order to minimize the time required for encryption and decryption.

In this embodiment the key length (L) is ≤128 bits.

In a further embodiment the key length (L) is ≤56 bits.

The invention further provides a system for transmitting messages in real time between users in a closed network of a vehicle having the features disclosed in claim 24.

The invention provides a system for transmitting messages in real time between users in a closed network of a vehicle, the system comprising:
(a) at least one transmitter which encrypts the safety-relevant real-time data of a message to be transmitted, including a transmitter ID of the transmitter, using a private key of the transmitter in order to generate an encrypted message;
(b) a vehicle bus for transmitting the encrypted message together with the unencrypted transmitter ID of the transmitter;
(c) and having at least one receiver which decrypts the received encrypted message using a public key of the transmitter identified by the received unencrypted transmitter ID in order to retrieve the unencrypted message and which compares the received transmitter ID with the transmitter ID contained in the retrieved message in order to determine whether the message has been transmitted correctly.

The invention further provides a transmitter within a closed network of a vehicle having the features disclosed in claim 25.

The invention provides a transmitter within a closed network of a vehicle, which transmitter, in order to transmit a message securely, encrypts safety-relevant real-time data of the message, including a transmitter ID of the transmitter, using a private key of the transmitter in order to generate an encrypted message and transmits the encrypted message, together with the unencrypted transmitter ID of the transmitter, to a receiver via a vehicle bus.

In an embodiment of the transmitter according to the invention, the transmitter calculates a transmit checksum for the safety-relevant real-time data to be transmitted, including the transmitter ID of the transmitter.

In an embodiment of the transmitter according to the invention, the transmitter encrypts the calculated transmit checksum using a private key of the transmitter in order to generate an encrypted transmit checksum.

In an embodiment of the transmitter according to the invention, the transmitter transmits the encrypted transmit checksum to the receiver via the vehicle bus.

In an embodiment of the transmitter according to the invention, the transmitter transmits the encrypted transmit checksum, together with the safety-relevant real-time data and together with the unencrypted transmit checksum, to the receiver via the vehicle bus.

The invention further provides a receiver within a closed network of a vehicle, which receiver, in order to retrieve the unencrypted message, decrypts a received, encrypted message using a public key that is identified by an unencrypted transmitter ID received together with the encrypted message, and compares the received transmitter ID with the transmitter ID contained in the retrieved message in order to determine whether the message has been transmitted correctly.

In an embodiment of the receiver according to the invention, the receiver decrypts the encrypted transmit checksum received via the vehicle bus using a public key of the transmitter identified by the received unencrypted transmitter ID in order to determine a first receive checksum.

In an embodiment of the receiver according to the invention, the receiver calculates a second receive checksum on the received safety-relevant real-time data including the transmitter ID of the transmitter.

In an embodiment of the receiver according to the invention, the receiver recognizes a correct transmission of the safety-relevant real-time data and of the transmitter ID if the first receive checksum is identical to the second receive checksum.

In an embodiment of the receiver according to the invention, the receiver decrypts the encrypted transmit checksum received via the vehicle bus using a public key of the transmitter identified by the received, unencrypted transmitter ID in order to determine a first receive checksum.

In an embodiment of the receiver according to the invention, the receiver receives the transmitted, unencrypted transmit checksum as a second receive checksum and compares it with the determined first receive checksum.

In an embodiment of the receiver according to the invention, the receiver recognizes a correct transmission of the safety-relevant real-time data and of the transmitter ID if the first receive checksum matches the second receive checksum.

The invention further provides a computer program for performing a method for transmitting a message in real time between users in a closed network of a vehicle, comprising the following steps of:
(a) encrypting safety-relevant real-time data of a message, including a transmitter ID of a transmitter within the closed network, using a private key of the transmitter in order to generate an encrypted message;
(b) transmitting the encrypted message, together with the unencrypted transmitter ID of the transmitter, from the transmitter to a receiver within the closed network via a vehicle bus;
(c) decrypting the encrypted message by the receiver using a public key of the transmitter identified by the received unencrypted transmitter ID in order to retrieve the unencrypted message;
(d) comparing the received transmitter ID with the transmitter ID contained in the retrieved message in order to determine whether the message has been transmitted correctly.

The invention further provides a data medium for storing a computer program of said type.

Preferred embodiments of the method and system according to the invention will be described hereinafter with reference to the schematic drawing, attached for the purpose of explaining features essential to the invention and in which:

DESCRIPTION OF THE INVENTION

Figure 1:
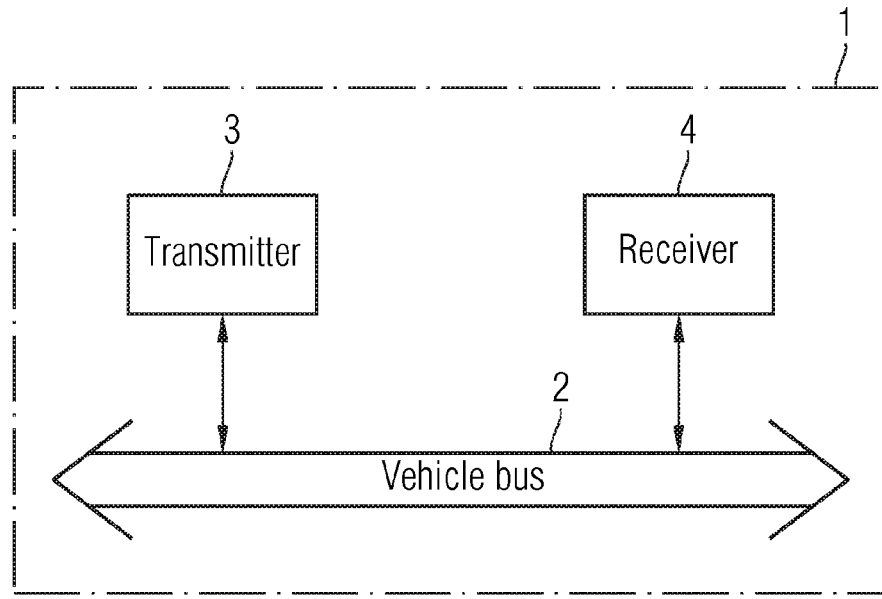
FIG. 1 is a block diagram of a possible embodiment of the system according to the invention for transmitting messages in real time between users in a closed network of a vehicle according to the invention.

As can be seen from FIG. 1, a vehicle 1, for example a rail-mounted vehicle, has an internal vehicle bus 2. The vehicle 1 may be a train comprising a locomotive and a plurality of cars. The cars are coupled to one another and attached to the towing locomotive. The cars and the towing locomotive are coupled mechanically and electrically in such a way that the vehicle bus 2 also interconnects the transmitters and receivers in different cars. The vehicle bus 2 within the vehicle 1 connects a plurality of electronic constituent parts connected thereto. Said electronic constituent parts are control units, for example. The control units within a rail-mounted vehicle 1 are, for example, brake control units, drive controllers and air conditioning system controllers. These different control units can be connected to a server which is disposed for example in a locomotive. The control units exchange data, transmitted by means of data packets for example, with one another via the vehicle bus 2. In an alternative embodiment the different control units are assigned predetermined time slots. A transmitter unit 3 sends data to a receiver 4 within the vehicle 1 via the vehicle bus 2. The data can be safety-relevant real-time data exchanged in a message between the users 3, 4. In the system according to the invention, as shown in FIG. 1, the transmitter 3 encrypts the safety-relevant real-time data D of a message N to be transmitted, including a transmitter ID A-ID of the transmitter 3, using a private key $K_{priv}$ of the transmitter 3 in order to generate an encrypted message N'. This encrypted message N' is then transmitted by the transmitter 3 together with the unencrypted transmitter ID A-ID of the transmitter 3 via the vehicle bus 2. The receiver 4 decrypts the received encrypted message N' using a public key $K_{public}$ of the transmitter 3 identified by the received, unencrypted transmitter ID A-ID in order to retrieve the unencrypted message N. The receiver 4 compares the unencrypted, transmitted and received transmitter ID A-ID with the transmitter ID contained in the retrieved message N in order to determine whether the message N has been transmitted correctly. If the receiver 4 recognizes that the message N has not been transmitted correctly, error handling is performed.

Figure 2:
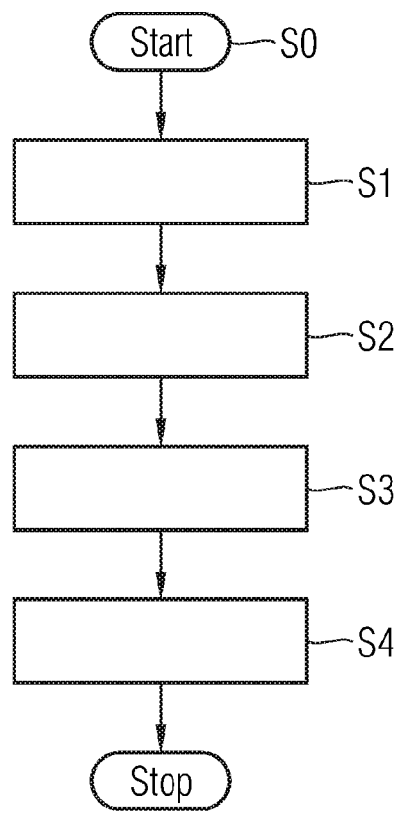
FIG. 2 is a flow diagram of a possible embodiment of the method according to the invention in a closed network of a vehicle according to the invention.

FIG. 2 shows a flow diagram of a possible embodiment of real-time data transmission between users. Following a start step S0, which is carried out at regular time intervals or in response to an event, the safety-relevant real-time data D of a message N, including the transmitter ID A-ID of the transmitter 3 within the closed network, is encrypted in a first step S1 using a private key $K_{privA}$ of the transmitter 3 in order to generate an encrypted message N'.

In step S2, the encrypted message N' together with an unencrypted transmitter ID A-ID of the transmitter 3 is then transmitted from the transmitter 3 to the receiver 4 within the closed network via the vehicle bus 2.

In a further step S3, the received encrypted message N' is decrypted by the receiver 4 using a public key ($K_{public}$) of the transmitter 3 identified by the received, unencrypted transmitter ID in order to retrieve the unencrypted message N.

In a further step S4, the receiver 4 compares the received transmitter ID A-ID with the transmitter ID contained in the retrieved message N in order to determine whether the message has been transmitted correctly or not.

Figure 3:
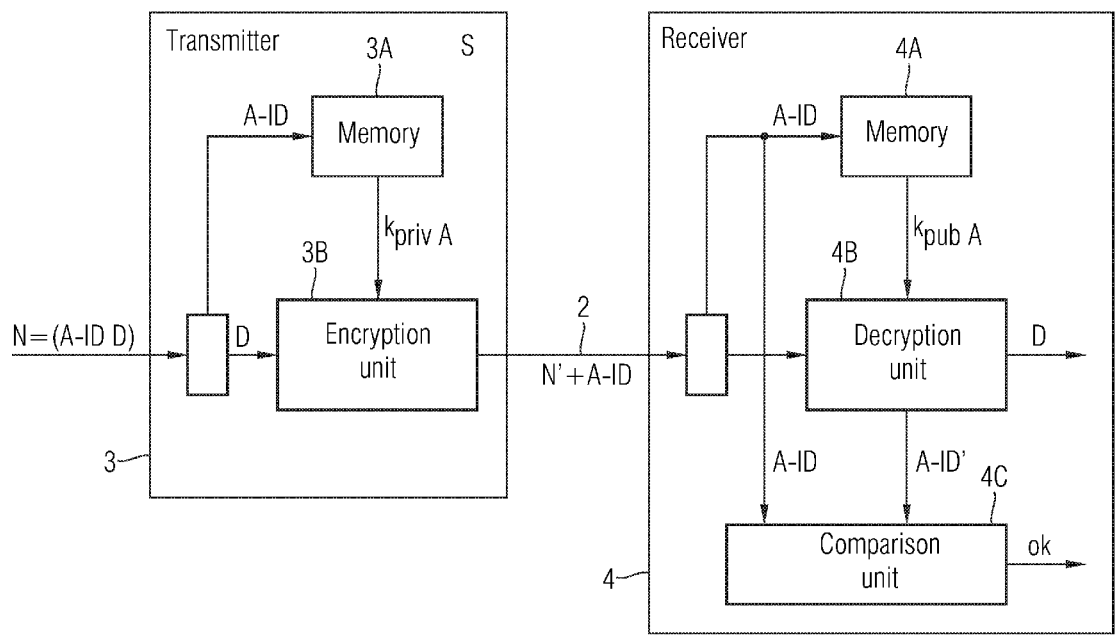
FIG. 3 is a block diagram of a possible embodiment of a transmitter according to the invention and of a receiver according to the invention.

FIG. 3 illustrates the procedure in a possible embodiment. A message N that is to be transmitted and contains safety-relevant real-time data D and a transmitter ID A-ID is to be transmitted from the transmitter 3 to the receiver 4. In the embodiment shown in FIG. 3, the transmitter ID A-ID of the message N to be transmitted addresses a memory cell within a memory 3A in order to read out a private key $K_{privA}$ of the transmitter 3. The safety-relevant real-time data D of the message N to be transmitted, including the transmitter ID A-ID of the transmitter 3, is encrypted using the read private key $K_{privA}$ of the transmitter in order to generate an encrypted message N'. The encryption of the real-time data D and the transmitter ID of the transmitter 3 is carried out by an encryption unit 3B within the transmitter 3. The transmitter 3 then sends the encrypted message N', together with the unencrypted transmitter ID of the transmitter 3, to the receiver 4 via the vehicle bus 2.

The receiver 4 decrypts the encrypted message N' received via the vehicle bus 2 using a public key ($K_{publicA}$) which is identified by the received, unencrypted transmitter ID A-ID. The received, unencrypted transmitter ID addresses a memory cell or a memory area in a memory 4A of the receiver 4 for reading the associated public key $K_{publicA}$. A decryption unit 4B of the receiver 4 decrypts the received, encrypted message N' with the aid of the read public key $K_{publicA}$ in order to retrieve the unencrypted message N and in order to retrieve the transmitter ID A-ID contained in the encrypted message N'. Said retrieved transmitter ID A-ID' is compared with the unencrypted, transmitted transmitter ID A-ID by a comparison unit 4C within the receiver 4 in order to determine whether the message has been transmitted correctly or not. If the transmitter ID A-ID transmitted unencrypted is different from the transmitter ID A-ID' retrieved from the decrypted message N', an error has occurred during transmission of the message. In this case error handling is initiated.

In a first embodiment of the method according to the invention, the transmitter 3 calculates a transmit checksum C on the safety-relevant real-time data D including the transmitter ID of the transmitter 3. The encryption unit 3B of the transmitter 3 encrypts the calculated transmit checksum C using the read private key $K_{privA}$ of the transmitter 3 in order to generate an encrypted checksum C'. Said encrypted transmit checksum C' is transmitted from the transmitter 3, together with the safety-relevant real-time data D including the transmitter ID A-ID of the transmitter 3, to the receiver 4 via the vehicle bus 2. The decryption unit 4B of the receiver 4 decrypts the encrypted transmit checksum C' received via the vehicle bus 2 using the public key $K_{publicA}$, read from the memory 4A, of the transmitter 3 identified by the received, unencrypted transmitter ID in order to determine a first receive checksum $C_1$. In addition the receiver 4 calculates a second receive checksum $C_2$ on the received, safety-relevant real-time data D and the decrypted message, including the transmitter ID of the transmitter 3. The first receive checksum $C_1$ and the second receive checksum $C_2$ are then compared. The receiver 4 recognizes a correct transmission of the safety-relevant data D and of the transmitter ID if the first receive checksum $C_1$ is identical to the second receive checksum $C_2$.

In a second alternative embodiment of the method according to the invention, the transmitter 3 transmits the encrypted transmit checksum C', together with the safety-relevant real-time data D including the transmitter ID and together with the unencrypted transmit checksum C, to the receiver 4 via the vehicle bus 2. The decryption unit 4B within the receiver 4 decrypts the encrypted transmit checksum C' received via the vehicle bus 2 using the read public key $K_{publicA}$ of the transmitter 3 identified by the received, unencrypted transmitter ID A-ID in order to determine a first receive checksum $C_1$. The receiver 4 receives the transmitted, unencrypted transmit checksum C as a second receive checksum $C_2$ and compares this with the determined first receive checksum $C_1$. The receiver 4 recognizes a correct transmission of the safety-relevant data and of the transmitter ID if the first receive checksum $C_1$ matches the second receive checksum $C_2$.

In a possible embodiment of the method according to the invention, the checksums are formed using a CRC (Cyclic Redundancy Check) method. The method according to the invention uses an asymmetric encryption method as proof of security or as proof of a correct transmission of a message. In this case proof of the correctness of the data D of the transmitter 3 and therefore an applicatory security mechanism is thus possible. For this purpose each communications user connected to the vehicle bus 2 receives a public and a private secret key. The safety-relevant data part of the message or telegram, including the transmitter ID of the transmitter 3, is encrypted using the private key $K_{priv}$ of the transmitter 3 and transmitted as a message, together with the unencrypted information identifying the transmitter. The receiver 4 can then decrypt the message of the transmitter 3 using the public key $K_{public}$ of the transmitter 3. By means of the method according to the invention it is possible to identify data corruption on the communication path, as well as an attempt at falsely masquerading as the transmitter 3. The transmitted data is protected by means of the method according to the invention not only against technical corruptions, but also against deliberate hacker attacks.

The method according to the invention enables communication between an arbitrary number of users and is therefore suitable for communication in closed networks that also have a relatively high number of components communicating with one another.

In a possible embodiment of the method according to the invention, the real-time data D output by the components or control units has different priority levels. For example, real-time data for the brake controller has a higher priority than real-time data for the sanitary facilities controller. Since only a very short delay time may occur in the case of particularly safety-critical real-time data, in an embodiment of the method according to the invention the key length L of a key K for encrypting the real-time data D is set as a function of the respective priority level of the real-time data D. The shorter the key length L, the quicker real-time data can be encrypted and then decrypted. Nevertheless, keys with a relatively short key length L of, for example, less than 56 bits, also still offer sufficient protection against manipulation attempts by third parties. Since only very short delay times are allowed to occur in the case of safety-critical real-time data D, real-time data having a very high priority level, i.e. particularly safety-critical and time-critical real-time data, is therefore encrypted using a key K having a short key length L, while other data having a lower priority level is encrypted using a key K having a longer key length L. Real-time data D having a high priority level and having a shorter permitted response time is therefore encrypted using a key K having a short key length, for example having a key length L of less than 128 bits, in order to minimize the time required for encryption and decryption.

In a possible embodiment, real-time data D having a high priority level and a short permitted response time is encrypted using a key K that has a key length L of less than 56 bits.

The transmitted real-time data D may be any real-time data, for example sensor data generated by sensors or control data transmitted by a controller.

The vehicle 1 is, for example, a rail-mounted vehicle such as a train. However, the vehicle 1 may also be another vehicle that has an internal closed network, for example an aircraft, ship or motor vehicle.

The invention claimed is:

1. A method for transmitting a message in real time between users in a closed network of a vehicle, the method which comprises:
   in an encryption unit, encrypting safety-relevant real-time data of a message and a transmitter ID of a transmitter using a private key of the transmitter in order to generate an encrypted message;
   transmitting the encrypted message, which includes the safety-relevant real-time data and the transmitter ID, together with an unencrypted transmitter ID of the transmitter which is in unencrypted form, from the transmitter to a receiver within the closed network via a vehicle bus;
   in the receiver, receiving the encrypted message and the unencrypted transmitter ID;
   using the unencrypted transmitter ID that was received by the receiver to obtain a public key of the transmitter;
   in a decryption unit, decrypting the encrypted message received by the receiver using the public key of the transmitter to obtain the safety-relevant real-time data and a decrypted transmitter ID; and
   comparing the unencrypted transmitter ID with the decrypted transmitter ID in order to determine whether the message has been transmitted correctly.

2. The method according to claim 1, which comprises calculating with the transmitter a transmit checksum on the safety-relevant real-time data to be transmitted, including the transmitter ID of the transmitter.

3. The method according to claim 2, which comprises encrypting with the transmitter the calculated transmit checksum using a private key of the transmitter in order to generate an encrypted checksum.

4. The method according to claim 3, which comprises transmitting from the transmitter the encrypted transmit checksum, together with the safety-relevant real-time data including the transmitter ID of the transmitter, to the receiver via the vehicle bus.

5. The method according to claim 4, which comprises encrypting with the receiver the encrypted transmit checksum received via the vehicle bus using a public key of the transmitter identified by the received, unencrypted transmitter ID in order to determine a first receive checksum.

6. The method according to claim 5, which comprises calculating with the receiver a second receive checksum on the received safety-relevant real-time data including the transmitter ID of the transmitter.

7. The method according to claim 6, wherein the receiver recognizes a correct transmission of the safety-relevant data and of the transmitter ID if the first receive checksum is identical to the second receive checksum.

8. The method according to claim 3, which comprises transmitting with the transmitter the encrypted transmit checksum, together with the safety-relevant real-time data including the transmitter ID and together with the unencrypted transmit checksum, to the receiver via the vehicle bus.

9. The method according to claim 8, which comprises decrypting with the receiver the encrypted transmit checksum received via the vehicle bus using a public key of the transmitter identified by the received, unencrypted transmitter ID in order to determine a first receive checksum.

10. The method according to claim 9, which comprises receiving with the receiver the transmitted, unencrypted transmit checksum as a second receive checksum and comparing same with the determined first receive checksum.

11. The method according to claim 10, wherein the receiver recognizes a correct transmission of the safety-relevant data and of the transmitter ID if the first receive checksum matches the second receive checksum.

12. The method according to claim 2, which comprises forming the checksums using a CRC (Cyclic Redundancy Check) method.

13. The method according to claim 1, wherein the vehicle is a rail-borne vehicle.

14. The method according to claim 13, wherein the transmitter is a control unit within the vehicle.

15. The method according to claim 13, wherein the receiver is a control unit within the vehicle.

16. The method according to claim 14, wherein a plurality of control units are connected via a common vehicle bus.

17. The method according to claim 16, wherein the control units are connected to a central control unit via the vehicle bus.

18. The method according to claim 14, wherein the control unit is a control unit selected from the group consisting of a brake controller, a drive controller, a sanitary facilities controller, and an air conditioning system controller.

19. The method according to claim 17, wherein the real-time data output by the control units have different priority levels.

20. The method according to claim 19, wherein a key length of a key for encrypting the real-time data is set as a function of the respective priority level of the real-time data.

21. The method according to claim 20, which comprises encrypting the real-time data having a high priority level and having a short permitted response time using a key of short key length in order to minimize a time required for encryption and decryption.

22. The method according to claim 21, which comprises selecting a key with a key length≤128 bits.

23. The method according to claim 22, wherein the key length is ≤56 bits.

24. A system for transmitting messages in real time between users in a closed network of a vehicle, the system comprising:
a vehicle bus;
at least one transmitter configured to encrypt safety-relevant real-time data of a message to be transmitted, including a transmitter ID of said transmitter, using a private key of said transmitter in order to generate an encrypted message, said transmitter configured to transmit the encrypted message, which includes the safety-relevant real-time data and the transmitter ID of said transmitter, together with an unencrypted transmitter ID of said transmitter, on said vehicle bus; and
at least one receiver connected to said vehicle bus and configured to decrypt the encrypted message received through said vehicle bus using a public key of said transmitter identified by the received unencrypted transmitter ID in order to decrypt the encrypted message and obtain a decrypted Transmitter ID;

said receiver configured to compare the decrypted transmitter ID with the unencrypted transmitter ID in order to determine whether the message has been transmitted correctly.

25. In a closed network of a vehicle, a receiver connected to concurrently receive an unencrypted transmitter ID and an encrypted message, which includes an encrypted transmitter ID and safety-relevant real-time data, from a transmitter, the receiver comprising:
a memory configured to store a public key;
a decryption unit connected to the memory to obtain a public key that is selected based on the unencrypted transmitter ID that was received by the receiver together with the encrypted message, the decryption unit configured to obtain a decrypted transmitter ID by decrypting the encrypted message using the public key that was selected based on the unencrypted transmitter ID that was received by the receiver together with the encrypted message; and
a comparison unit configured to compare the unencrypted transmitter ID with the decrypted transmitter ID obtained by decrypting the encrypted message in order to determine whether the message has been transmitted correctly.

26. The receiver according to claim 25, wherein the receiver is configured to decrypt an encrypted transmit checksum received via a vehicle bus using the public key of a transmitter identified by the received unencrypted transmitter ID in order to determine a first receive checksum.

27. The receiver according to claim 26, wherein the receiver is configured to calculate a second receive checksum on the received safety-relevant real-time data including the transmitter ID of the transmitter.

28. The receiver according to claim 27, wherein the receiver is configured to recognize a correct transmission of the safety-relevant real-time data and of the transmitter ID if the first receive checksum is identical to the second receive checksum.

29. The receiver according to claim 25, wherein the receiver is configured to decrypt the encrypted transmit checksum received via a vehicle bus using a public key of a transmitter identified by the received, unencrypted transmitter ID in order to determine a first receive checksum.

30. The receiver according to claim 29, wherein the receiver is configured to receive the transmitted, unencrypted transmit checksum as a second receive checksum and to compare same with the determined first receive checksum.

31. The receiver according to claim 30, wherein the receiver is configured to recognize a correct transmission of the safety-relevant real-time data and of the transmitter ID if the first receive checksum matches the second receive checksum.

32. A non-transitory data medium for storing the computer program including computer code which, when loaded into a main memory of the computer, enables the computer to perform the method according to claim 1.

* * * * *